United States Patent [19]
Sawyer

[11] Patent Number: 5,828,952
[45] Date of Patent: *Oct. 27, 1998

[54] SYSTEM AND METHOD FOR EXECUTING SIGNALLING CUT-THROUGH

[75] Inventor: Steven Paul Sawyer, Fountain Hills, Ariz.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 578,256

[22] Filed: Dec. 26, 1995

[51] Int. Cl.$^6$ ........................................ H04Q 7/36
[52] U.S. Cl. .................. 455/427; 455/428; 455/430; 455/455
[58] Field of Search .................... 455/427, 428, 455/455, 31.3, 403, 12.1, 13.1, 445, 430, 422; 342/352; 370/316

[56] References Cited

U.S. PATENT DOCUMENTS

| | | | |
|---|---|---|---|
| 4,506,383 | 3/1985 | McGann | 455/13.1 |
| 5,345,448 | 9/1994 | Keskitalo | 455/422 |
| 5,523,997 | 6/1996 | Bishop, Jr. | 455/428 |

*Primary Examiner*—Dwayne D. Bost
*Assistant Examiner*—Keith Ferguson
*Attorney, Agent, or Firm*—Harold C. McGurk

[57] ABSTRACT

A system (10) and method (100) reduce an amount of signalling resources used for calls involving more than one gateway (40, 41). Instead of having two gateways (40, 41) handle signalling resources, one gateway (40) becomes the serving gateway for a subscriber unit call segment. For signalling cut-through, a call is set-up in the usual way with a transit connection established between gateways (40, 41). After normal call set-up completed, including voice cut-through, signalling cut through is invoked to remove the need to maintain the transit connection and one local connection for the duration of the call. The old local connection is replaced with a new local connection to the serving gateway.

14 Claims, 3 Drawing Sheets

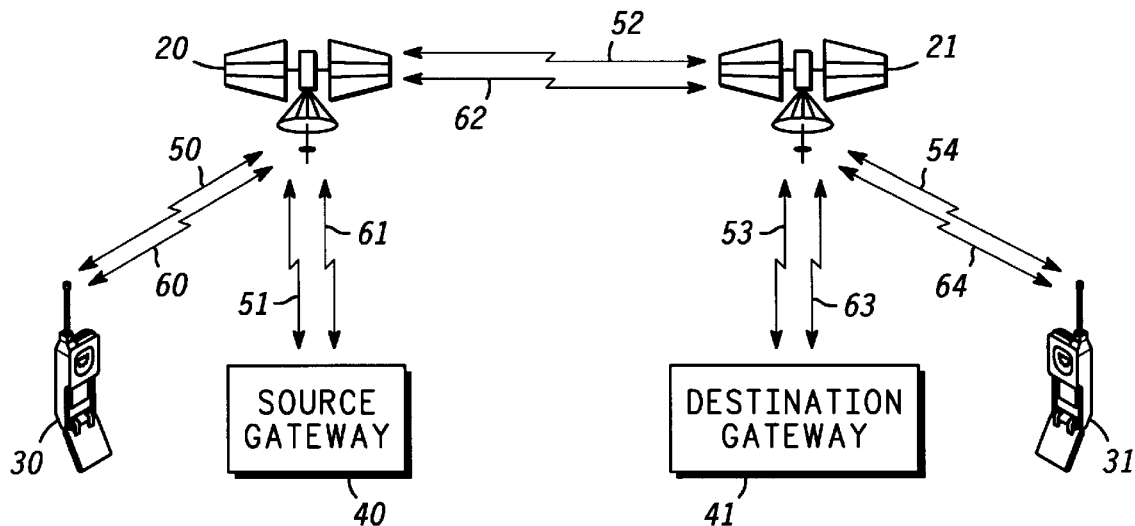
FIG. 1
-PRIOR ART-
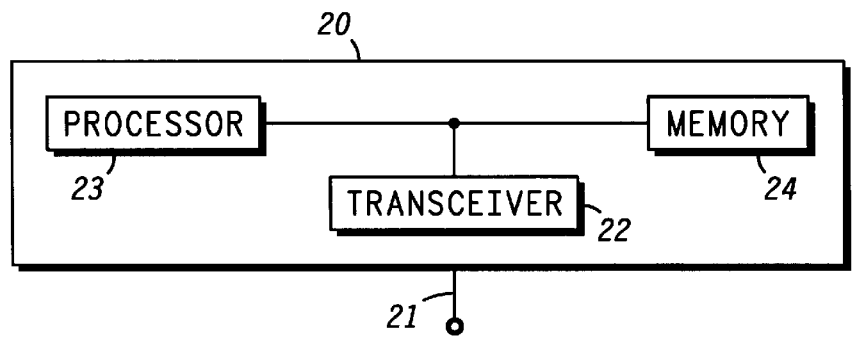
FIG. 2
FIG. 4
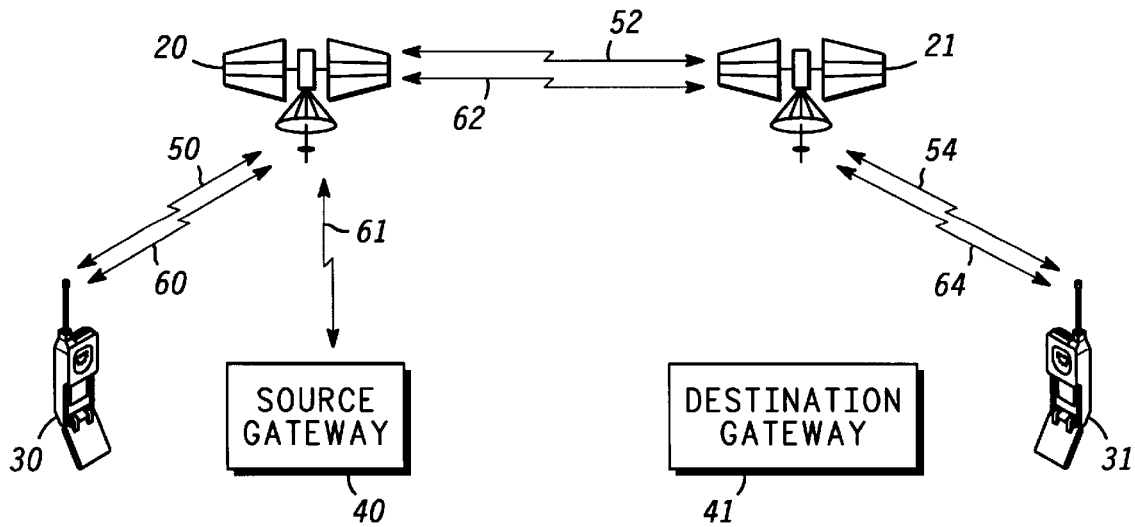

SYSTEM AND METHOD FOR EXECUTING SIGNALLING CUT-THROUGH

TECHNICAL FIELD

This invention relates generally to telecommunication systems and, in particular, to a system and a method for eliminating unnecessary signalling connections.

BACKGROUND OF THE INVENTION

Whenever a subscriber unit (e.g., mobile telecommunication telephone) located at a first gateway wants to communicate with another subscriber unit located a second gateway, a conventional call set-up process is executed to establish signalling and mission connections so that the two subscriber units can communicate with each other. A signalling connection is used for passing control or signalling information between two nodes, for example, a subscriber unit and a gateway. A mission connection is used for passing voice and/or data between two subscriber units. Both the signalling and mission connections are necessary for handling a call between two subscriber units in a telecommunications network.

The normal call set-up process will be described as it relates to telecommunication system 10 as shown in FIG. 1. When subscriber unit 30 wants to communicate with subscriber unit 31, subscriber unit 30 first establishes a signalling connection to source gateway 40. The signalling connection may pass through a satellite and may include signalling segments 60 and 61 as shown in FIG. 1. Source gateway 40 then sets-up a subscriber unit half-call involving a local connection between itself and subscriber unit 30. A local connection includes both a local signalling connection and a local mission connection. The local mission connection is "half" of a call, because the two subscriber units 30 and 31 will eventually send mission data directly to each other.

Once the local connection is created by source gateway 40, source gateway 40 next determines where subscriber unit 41 is located by using, for example, standard GSM location methods involving HLR/VLR queries. HLR represents home location register, while VLR represents visitor location register. After determining that subscriber unit 31 is located in another gateway's region, source gateway 40 establishes a transit connection to the other gateway, i.e., destination gateway 41. A transit connection includes both a transit signalling connection and a transit mission connection. As shown in FIG. 1, these connections may pass through satellite 20 and 21 and include signalling segments 61, 62 and 63, and mission segments 51, 52 and 53.

After the transit connection is established, destination gateway 41 then sets-up a subscriber unit half-call which involves a local connection between itself and subscriber unit 31. The local connection includes both a local signalling connection and a local mission connection, and consists of local mission segments 63 and 64 and local signalling segments 63 and 64.

Once the two local connections and transit connection are established and a voice cut-through has occurred at both gateway 40 and 41, subscriber units 30 and 31 communicate with each other over a mission connection. A voice cut-through process executed by the gateways eliminates the need for the voice/data to pass through source gateway 40 and destination gateway 41. For example, voice/data is transmitted between subscriber units 30 and 31 over mission segments 50, 52 and 54, which bypasses mission segments 51 and 53.

This conventional call set-up process inefficiently reserves signalling resources, because after call set-up, the transit connection between two gateways is not normally used until call tear-down. Thus, there is a significant need for a system and a method that eliminates the need to maintain a transit connection.

BRIEF DESCRIPTION OF THE DRAWINGS

FIG. 1 shows an example of a prior art space-based mobile telecommunication system;

FIG. 2 shows a general view of the components of a node, including satellites, gateways and subscriber units according to a preferred embodiment of the present invention;

FIG. 4 shows signalling cut-through for a system where two subscriber units are communicating to each other;

DESCRIPTION OF THE PREFERRED EMBODIMENTS

Figure 3:
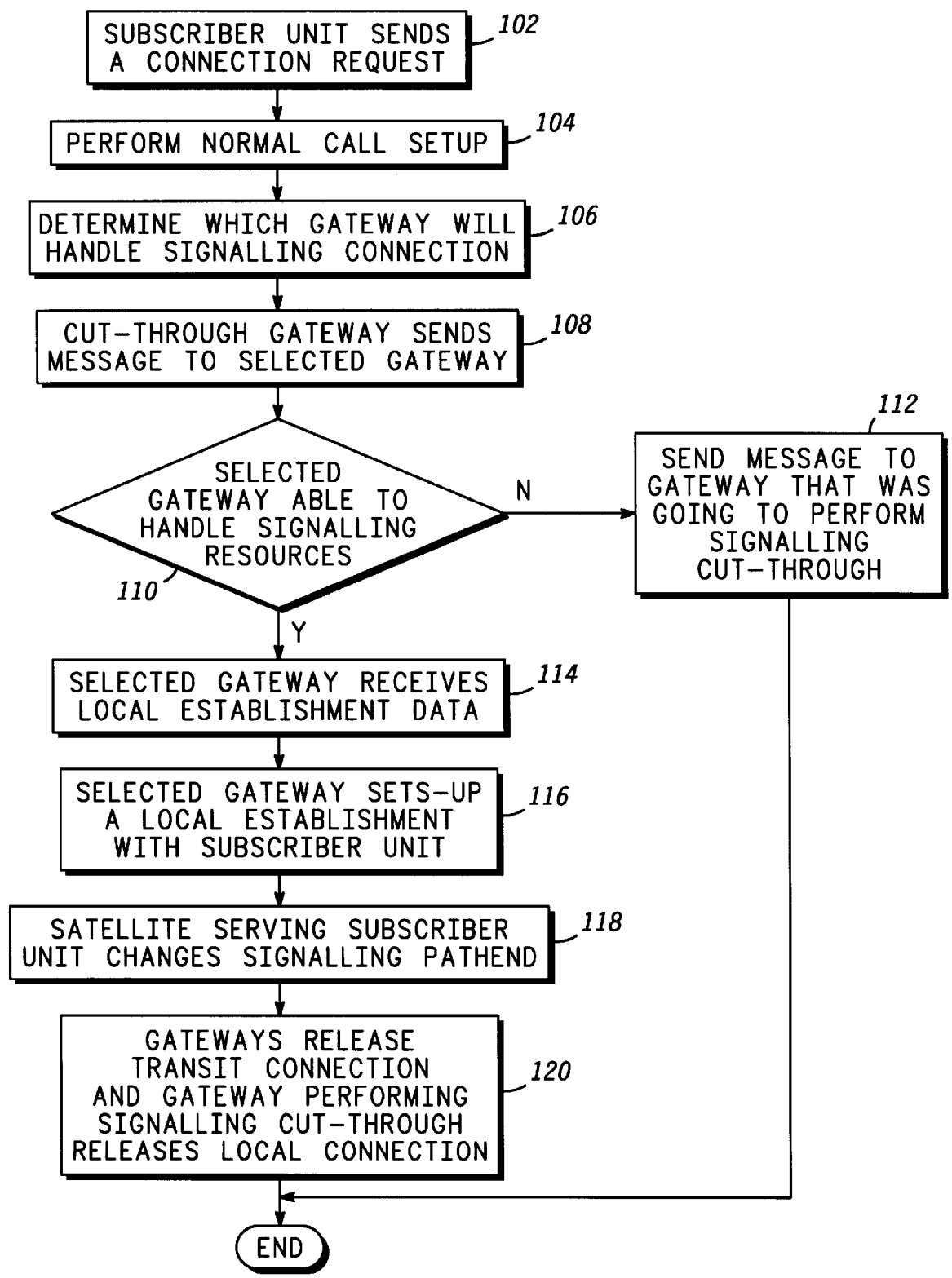
FIG. 3 shows a flowchart of a method for executing signalling cut-through according to a preferred embodiment of the present invention.

The present invention has utility in that it reduces the amount of resources reserved for the duration of the call for calls involving more than one gateway. Instead of having two gateways handle signalling resources, one gateway is the serving gateway for a subscriber unit call segment. The most logical gateway chosen to be the serving gateway is based on the call arrangement. For signalling cut-through, a call is set-up in the usual way with a transit connection established between gateways. After normal call set-up is completed, including voice cut-through, signalling cut-through is invoked to remove the need to maintain the transit connection(s) and one local connection for the duration of the call. The old local connection is replaced with a new local connection from the newly selected serving gateway to the subscriber unit.

A "satellite" as used throughout this description means a man-made object or vehicle intended to orbit the earth. A "satellite" comprises geostationary, low-earth and medium-earth orbiting satellites and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial or space-based telecommunication systems and/or combinations thereof.

FIG. 1 shows an example of space-based telecommunication system 10. Although FIG. 1 illustrates a highly simplified diagram of mobile telecommunication system 10, system 10 comprises at least one satellite 20, any number of subscriber units 30 and at least two gateways 40, 41. Generally, satellites 20, 21, subscriber units 30, 31 and gateways 40, 41 of telecommunication system 10 may be viewed as a network of nodes. All nodes of communication system 10 are or may be in data communication with other nodes of communication system 10 through communication links. In addition, all nodes of telecommunication system 10 are or may be in data communication with other telephonic devices dispersed throughout the world through public service telephone networks (PSTNs) and/or conventional terrestrial communication devices coupled to a PSTN through conventional terrestrial base stations.

The present invention is applicable to space-based telecommunication systems 10 that assign particular regions on the earth to specific cells on the earth, and preferably to systems 10 that move cells across the surface of the earth. Although the present invention is applicable to space-based telecommunication systems 10 having at least one satellite 20 in low-earth, medium-earth or geosynchronous orbit, satellite 20 is preferably in low-earth orbit around earth. Satellite 20 may be a single satellite or one of many satellites 20, 21 in a constellation of satellites orbiting earth. The present invention is also applicable to space-based telecommunication systems 10 having satellites 20, 21 which orbit earth at any angle of inclination including polar, equatorial, inclined or other orbital patterns. The present invention is applicable to systems 10 where full coverage of the earth is not achieved (i.e., where there are "holes" in the telecommunication coverage provided by the constellation) and to systems 10 where plural coverage of portions of the earth occur (i.e., more than one satellite is in view of a particular point on the earth's surface).

Each satellite 20 communicates with other nearby satellites 21 through cross-links. These cross-links form a backbone of space-based mobile telecommunication system 10. Thus, a call or communication from subscriber unit 30 located at any point on or near the surface of the earth may be routed through satellite 20 or a constellation of satellites 20, 21 to within range of substantially any other point on the surface of the earth. A communication may be routed down to subscriber unit 31 (which is receiving the call) on or near the surface of the earth from satellite 21. How satellite 20 physically communicates (e.g., spread spectrum technology) with subscriber units 30 and gateway 40 is well known to those of ordinary skill in the art.

Subscriber units 30, 31 may be located anywhere on the surface of earth or in the atmosphere above earth. Mobile telecommunication system 10 may accommodate any number of subscriber units 30, 31. Subscriber units 30, 31 are preferably communication devices capable of receiving voice and/or data from satellites 20, 21 and/or gateways 40, 41. By way of example, subscriber units 30, 31 may be hand-held, mobile satellite cellular telephones adapted to transmit to and receive transmissions from satellites 20, 21 and/or gateways 40, 41. Moreover, subscriber units 30 may be computers capable of sending email messages, video signals or facsimile signals just to name a few.

How subscriber units 30, 31 physically transmit voice and/or data to and receive voice and/or data from satellites 20, 21 is well known to those of ordinary skill in the art. In the preferred embodiment of the present invention, subscriber unit 30 communicates with satellite 20 using a limited portion of the electromagnetic spectrum that is divided into numerous channels. The channels are preferably L-Band, K-Band, S-band frequency channels or combination thereof, but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Gateways 40, 41 communicate with and control satellites 20, 21. There may be multiple gateways 40, 41 located at different regions on the earth. For example, there may be one gateway 40 located in Honolulu, another gateway 41 located in Los Angeles and another gateway in Washington, D.C. Another example is to have separate gateways 40 located in each country on the earth. Gateways 40, 41 may provide satellite signalling commands to satellites 20, 21 so that satellites 20, 21 maintain their proper position in their orbit and perform other essential house-keeping tasks. Gateways 40, 41 may be additionally responsible for receiving voice and/or data from satellites 20, 21. How gateways 40, 41 physically communicate (e.g., spread spectrum) with satellites 20, 21 and/or subscriber units 30, 31 is well known to those of ordinary skill in the art.

FIG. 2 shows a general view of the components of a node, including satellites 20 and 21, gateways 40 and 41 and subscriber units 30 and 31 according to a preferred embodiment of the present invention. For purposes of this description, reference will be made to satellite 20, although most of the components are similar to those in gateway 40. Satellite 20 comprises at least the following components: antenna 21, transceiver 22, processor 23 and memory 24. There may be other components of satellite 20 that are not shown which are necessary for operating a satellite but are not important to the present invention. These other components are well known to those of ordinary skill in the art, including for example, solar arrays and fuel propulsion system in satellites 20, or switches and network routers in gateways 40. Moreover, there may be more than one of the components in satellite 20, such as multiple antennas 21 and processors 23, for example.

Antenna 21 of satellite 20 is coupled to transceiver 22, while transceiver 22, processor 23 and memory 24 are inter-coupled to each other. Transceiver 22 is able to transmit or receive data or voice, and may be for example, a modem. Transceiver 22 is also capable of receiving data from subscriber units 30 and/or gateway 40. Processor 23, via a software program controls the operation of satellite 20 and the other components of satellite 20. Memory 24 stores part of the software executable version of method 100 (described below) and other software programs. Antenna 21, transceiver 22, processor 23 and memory 24 are all well known to those of ordinary skill in the art.

FIG. 3 shows a flowchart of method 100 for executing signalling cut-through according to a preferred embodiment of the present invention. Although method 100 is applicable to satellite systems, method 100 is also applicable to any system which provides a choice of gateways for a given subscriber unit, even if satellites are not part of the system.

One of the important purposes of method 100 is to allow one gateway to handle post set-up signalling associated with a call. In cases where a voice cut-through is possible, meaning that the voice/data communication between subscriber unit 30 and 31 passes along mission segments 50, 52 and 54 and bypasses gateways 40, 41, there is no need for two gateways to be involved in the signalling of this call. In other words, the signalling can be handled by one of the gateways. Method 100 assumes therefore that at least two gateways are initially involved in the call.

Method 100 is a software program that is executed by a number of network nodes (e.g., satellites 20 and 21, subscriber units 30 and 31, and gateways 40 and 41) in the preferred embodiment. The network nodes may execute concurrently with this program other software programs as well.

This method is applicable to three different calling arrangements. The first arrangement is when subscriber unit 30 originates a call to subscriber unit 31, with subscriber unit 30 in a region serviced by source gateway 40 and with subscriber unit 31 in a region serviced by destination gateway 41. The second calling arrangement is when subscriber unit 30 originates a call to PSTN subscriber unit 31, where subscriber unit 30 is in a region serviced by source gateway 40, and where PSTN subscriber unit 31 is connected to destination gateway 41 over a PSTN. The third calling arrangement is when PSTN subscriber unit 30 originates a call to subscriber unit 31, where PSTN subscriber unit 30 is coupled to source gateway 40 via a PSTN, and subscriber unit 31 is in a region serviced by destination gateway 41. The execution of method 100 will be described as it relates to the first calling arrangement, followed by the second and third calling arrangements. Throughout this description, a "calling party" is the party originating the call. The "called party" is the party receiving or designated to receive the call.

Method 100 begins in step 102 when a subscriber unit accesses system 10 and sends a connection request to a satellite currently serving it. In the example shown in FIG. 1, the satellite that is currently serving subscriber unit 30 is satellite 20. The connection request includes information about the subscriber unit, including for example, a location of the subscriber unit on earth, a home gateway identification (ID) and a priority of the call, such as whether the call is an emergency call.

After satellite 20 receives the connection request, normal call set-up is performed in step 104 by the nodes of network 10. The normal call set-up procedure is described above and includes forming a two local connections and a transit connection. As shown in FIG. 1, the local signalling connection is formed between subscriber unit 30 and source gateway 40 through signalling segments 60 and 61. A transit signalling connection is created between source gateway 40 and destination gateway 41 through signalling segments 61, 62 and 63. A local signalling connection comprising signalling segments 63 and 64 is formed between destination gateway 41 and subscriber unit 31. The voice/data communicated between subscriber unit 30 and 31 passes along mission segments 50, 52 and 54.

After the normal call set-up procedure is executed in step 104, and the result is as shown in FIG. 1, there is voice cut-through at both of the two gateways involved. This is because the voice path between subscriber units 30 and 31 does not pass through either gateway 40 or 41. Hence, mission segments 51 and 53 are not needed and do not exist although they are shown in FIG. 1.

The gateways next determine in step 106 which one of the gateways will handle the signalling resources. In the preferred embodiment, this determination is dependent on what gateway is the first to perform a voice cut-through for a particular call. According to FIG. 1, destination gateway 41 as shown in FIG. 1 is the first gateway to perform voice cut-through. In alternative embodiments, source gateway 40 may be the first gateway to perform a voice cut-through. Since destination gateway 41 is the first gateway to perform voice cut-through, source gateway 40 will be the selected gateway to handle the signalling connections and resources, while destination gateway 41 will perform signalling cut-through. However, if the first gateway to perform voice cut-through had been source gateway 40, the remaining steps of method 100 are performed with the roles of the gateways reversed, with destination gateway 41 being the only gateway involved in the call.

The basic goal of signalling cut-through is to create a direct signalling connection (i.e., a local connection) between subscriber unit 31 and the gateway selected to handle the signalling connection (i.e., source gateway 40). This will require that source gateway 40 set-up a local connection to subscriber unit 31. This is accomplished by the remaining steps shown in the flowchart of FIG. 3. In step 108, destination gateway 41, the gateway that is going to perform the signalling cut-through, sends a message to source gateway 40 informing source gateway 40 that it was selected to handle the signalling connection for subscriber unit 31. Next, source gateway 40 determines in step 110 whether it can handle the signalling connection for subscriber unit 31. If source gateway 40 is unable to handle the signalling connection for subscriber unit 31 due to congestion or any other condition in the gateway that does not permit it to handle the signalling connection, source gateway 40 sends a message to destination gateway 41. This message informs destination gateway 41 not to perform signalling cut-through because source gateway 40 cannot handle the signalling connection for subscriber unit 31. Method 100 then ends and the call continues with the mission and signalling connections as shown in FIG. 1. However, if step 112 is performed, this means that the signalling resources are not more effectively utilized since the transit connection still is needed.

According to step 110, if source gateway 40 is able to handle the signalling connection for subscriber unit 31, the gateway performing the signalling cut-through (i.e., destination gateway 41) sends in step 114 a special message to the selected gateway (i.e., source gateway 40) that contains the signalling pathend of subscriber unit 31 and also all of the required data about the local connection between destination gateway 41 and subscriber unit 31. When source gateway 40 receives this message in step 114, source gateway 40 uses the information to establish in step 116 a local connection with subscriber unit 31. This means that the new local connection between source gateway 40 and subscriber unit 31 comprises multi-directional signalling segments 61, 62 and 64. Since destination gateway 41 already went through the whole local establishment process with subscriber unit 31, source gateway 40 does not have to repeat this process.

Once source gateway 40 establishes the local connection to subscriber unit 31, destination gateway 41 in step 118 informs the satellite serving subscriber unit 31 (i.e., satellite 21 in FIG. 1) to change its signalling pathend to "point to" source gateway 40, the gateway selected to handle the signalling connection, instead of pointing to destination gateway 41. Thereupon, satellite 21 changes it signalling pathend to point to source gateway 40. It is not necessary that the same satellite serve both subscriber unit 31 and destination gateway 41. One satellite may service destination gateway 41, while another satellite may service subscriber unit 31. However, it is important that destination gateway 41 be able to communicate with the satellite serving subscriber unit 31 so that the pathend can be changed.

After source gateway 40 sets-up the local connection with subscriber unit 31, the transit connection is released by source gateway 40 and destination gateway 41. This step is accomplished by both source gateway 40 and destination gateway 41 releases resources associated with the transit connection. Moreover, destination gateway releases in step 120 resources associated with the original local connection with subscriber unit 31. The mission connections and signalling connections result in a network as shown in FIG. 4.

FIG. 4 shows signalling cut-through for a system where two subscriber units are communicating to each other. Both of the local signalling connections are handled by source gateway 40. As shown in FIG. 4, system 10 has two local signalling connections and no transit connections. The first local connection between source gateway 40 and subscriber unit 30 comprises signalling segments 60 and 61. The second local connection between source gateway 40 and subscriber unit 31 comprises signalling segments 61, 62 and 64. Subscriber unit 30 and subscriber unit 31 communicate voice and/or data over mission segments 50, 52 and 54. Notice that there is no signalling or mission segments between destination gateway 41 and satellite 21 meaning that destination gateway 41 is no longer involved with the call in any way. Any subsequent cut-through, reconfiguration, supplementary service management, etc., is performed by source gateway 40.

Once method 100 executes step 120, method 100 ends. Signalling cut-through is complete and a single gateway handles all signalling connections and resources for both subscriber units 30 and 31.

Figure 5:
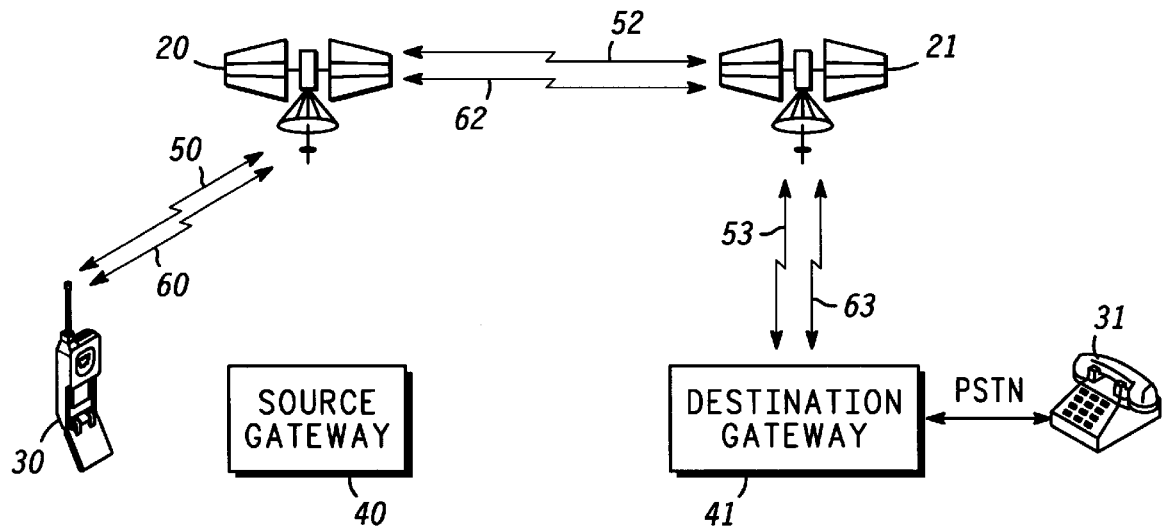
FIG. 5 shows signalling cut-through for a system where a subscriber unit is communicating to a PSTN subscriber.

When the called party is PSTN subscriber unit 31 connected over the public-switched telephone network (PSTN) to destination gateway 41 as shown in FIG. 5, method 100 is executed to eliminate unnecessary signalling connections, including any transit connections. In this case, since there is voice cut-through at source gateway 40 (meaning the voice path between subscriber unit 30 and PSTN subscriber unit 31 does not pass through source gateway 40), there will also be signalling cut-through at source gateway 40. The voice path passes through destination gateway 41 because PSTN subscriber unit 31 is connected to destination gateway 41 via the PSTN. According to step 106 of FIG. 3, since the voice path is passing through destination gateway 41 to PSTN subscriber unit 31, destination gateway 41 will also handle the signalling connections for subscriber unit 30. After execution of the steps in method 100 shown in FIG. 3, source gateway 40 will no longer be involved in handling the signalling connections as shown in FIG. 5. Destination gateway 41 solely handles the signalling resources for subscriber unit 30.

In the preferred embodiment, the signalling cut-through is accomplished by source gateway 40 sending signalling messages to both the satellite 20 serving subscriber unit 30 and to destination gateway 41. The latter message sent to destination gateway 41 includes all required data for destination gateway 41 to set-up a local connection with subscriber unit 30 without the need to actually go through the entire local establishment process that has already been performed by source gateway 40. Signalling redirect messages (or similar messages depending on the implementation) serve to trigger the actual cut-over from the old to the new configurations, after all of the advance preparations have been made. Resources associated with the transit connection between gateways 40 and 41 and with the local connection between source gateway 40 and subscriber unit 30 are released.

After signalling cut-through is performed as provided by the steps of method 100 (FIG. 3), the configuration of system 10 results in the mission and signalling connections shown in FIG. 5. As shown in FIG. 5, the bi-directional voice path between subscriber units 30 and 31 comprises mission segments 50, 52, and 53, while the local connection between subscriber unit 30 and destination gateway 41 comprises bi-directional signalling segments 60, 62 and 63.

Figure 6:
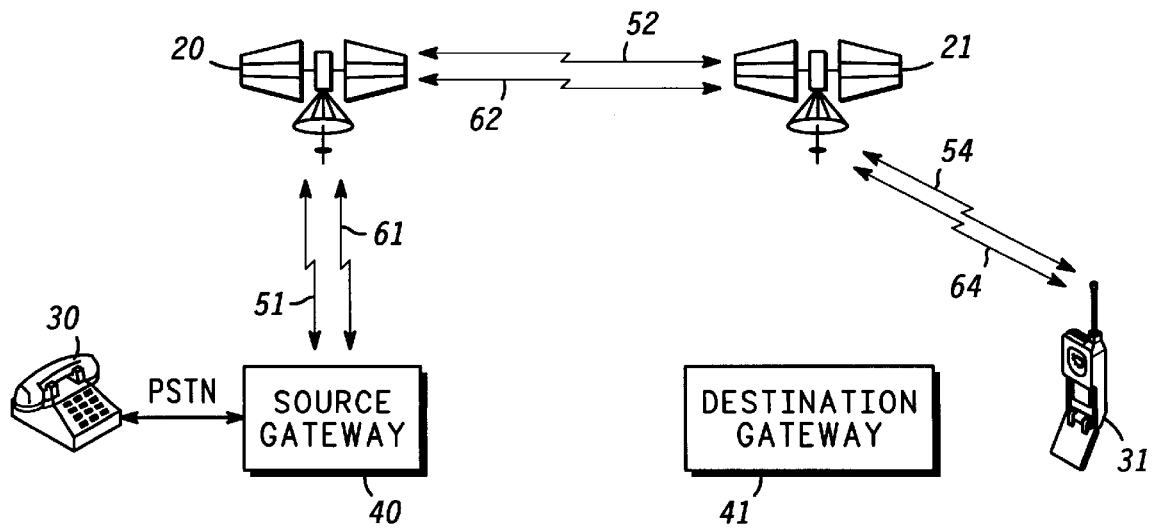
FIG. 6 shows signalling cut-through for system where a PSTN subscriber is communicating to a subscriber unit.

When a calling party is a PSTN subscriber unit at source gateway 40, the final network configuration after execution of method 100 results in a system shown in FIG. 6. This case is the reverse of the case when the called party is a PSTN subscriber at destination gateway 41. In this case, there will be voice cut-through at destination gateway 41, meaning that the voice path does not pass through destination gateway 41. Since there is voice cut-through at destination gateway 41, signalling cut-through is executed at destination gateway 41. Thus, destination gateway 41 no longer is involved with the call in any way, and source gateway 40 handles all further call signalling for subscriber unit 31.

Briefly, the signalling cut-through is accomplished by having destination gateway 41 send signalling messages to satellite 21 that is serving subscriber unit 31 and to source gateway 40. The messages sent to source gateway 40 includes all required data for source gateway 40 to set-up a local connection with subscriber unit 31 without the need to actually go through the entire local establishment process, since this process was already performed by destination gateway 41. Resources associated with the transit connection (at both gateways 40 and 41) and with destination gateway's 41 local connection with subscriber unit 31 are then released after the new local connection is established.

It will be appreciated by those skilled in the art that the present invention eliminates processing and transport capacity for signalling resources. The method generates a new local connection (i.e., subscriber unit call segment) that is handled by any gateway in the system with approximately equal efficiency. Thus, a significant advantage of the present invention is that it eliminate processing and transport capacity used for the transit connection. It is another advantage of the present invention to minimize usage of network gateway signalling resources, just as voice cut-through minimizes use of network gateway voice resources. Yet another advantage of the present invention is to reduce the need for transit capacity, since these call segments are used only for a short time per call. A further advantage of the present invention is to attach subscriber unit half-calls at the most logical gateway for the call. Rather than using transit trunks between gateways, another advantage of the present invention is that all calls (e.g., subscriber unit to subscriber unit, subscriber unit to PSTN and PSTN to subscriber unit) are handled by one gateway, thus minimizing usage of network gateway resources.

Accordingly, it is intended by the appended claims to cover all modifications of the invention which fall within the true spirit and scope of the invention.

What is claimed is:

1. A method for eliminating signalling connections in a network, comprising the steps of:
 a) establishing a first local connection, a second local connection and a transit connection;
 b) selecting a gateway to handle signalling resources;
 c) establishing a third local connection with the selected gateway; and
 d) eliminating the transit connection and one of the first and second local connections.

2. A method as recited in claim 1, wherein step (a) comprises the steps of:
 a1) establishing the first local connection between a first subscriber unit and a first gateway;
 a2) establishing a transit connection between the first gateway and a second gateway; and
 a3) establishing a second local connection between the second gateway and a second subscriber unit.

3. A method as recited in claim 1, wherein step (a) comprises the steps of:
 a1) establishing a first signalling segment between a first subscriber unit and a first satellite;

a2) establishing a second signalling segment between the first satellite and a first gateway;

a3) establishing a third signalling segment between the first gateway and the first satellite;

a4) establishing a fourth signalling segment between the first satellite and a second satellite;

a5) establishing a fifth signalling segment between the second satellite and a second gateway;

a6) establishing a sixth signalling segment between the second satellite and a second gateway; and a7) establishing a seventh signalling segment between the second satellite and a second subscriber unit.

4. A method as recited in claim 3, wherein the first local connection comprises the first signalling segment and the second signalling segment; and wherein the second local connection comprises the sixth signalling segment and the seventh signalling segment.

5. A method as recited in claim 3, wherein the transit connection comprises the third, fourth and fifth signalling segments.

6. A method as recited in claim 3, wherein step (d) comprises the step of eliminating the third, fourth and fifth signalling segments.

7. A method as recited in claim 3, wherein step (a3) comprises the step of establishing the fourth signalling segment from the first satellite, through a plurality of satellites to the second satellite.

8. A method as recited in claim 1, wherein the network comprises a first gateway and a second gateway, and wherein step (b) comprises the step of determining whether the first gateway or the second gateway first performed a voice cut-through.

9. A method as recited in claim 1, wherein the network includes a first subscriber unit and a second subscriber unit, and wherein step (b) comprises the steps of:

determining whether the first subscriber unit or the second subscriber unit is connected to the gateway or a second gateway via a public-switched telephone network;

selecting the gateway if the first subscriber unit or the second subscriber unit is connected to the gateway via the public-switched telephone network; and selecting the second gateway if the first subscriber unit or the second subscriber units is connected to the gateway via the public-switched telephone network.

10. A method as recited in claim 1, wherein step (c) comprises the steps of establishing third local connection between the selected gateway and a called party's subscriber unit.

11. A method for eliminating signalling connections in a network, comprising the steps of:

a) establishing a first local connection between a first gateway and a first subscriber unit;

b) establishing a transit connection between the first gateway and a second gateway;

c) establishing a second local connection between the second gateway and a second subscriber unit;

d) selecting a selected gateway from the first gateway or the second gateway based on which of the first gateway or the second gateway is first to perform a voice cut-through; and e) executing a signalling cut-through so that only the selected gateway services the network for a call between the first subscriber unit and the second subscriber unit.

12. A method as recited in claim 11, wherein the first gateway is the selected gateway and wherein step (e) comprises the steps of:

e1) the second gateway sending a message to the first gateway;

e2) the first gateway determining whether it can handle signalling resources; and e3) the first gateway sending a message to the second gateway if the first gateway is unable to handle the signalling resources.

13. A method as recited in claim 11, wherein the first gateway is the selected gateway and wherein step (e) comprises the steps of:

e1) the second gateway sending a message to the first gateway;

e2) the first gateway determining whether it can handle signalling resources;

e3) the first gateway receiving local establishment data from the second gateway if the first gateway can handle the signalling resources;

e4) the first gateway setting-up a third local connection between the first gateway and the second subscriber unit if the first gateway can handle the signalling resources; and e5) the first and second gateways releases the transit connection and the second local connection.

14. A system comprising:

a first subscriber unit;

a second subscriber unit;

a first gateway capable of establishing a first local connection to the first subscriber unit; and a second gateway capable of establishing a transit connection to the first gateway and a second local connection to the second subscriber unit, wherein the first gateway is capable of establishing a third local connection to the second subscriber unit and eliminating the transit connection and the second local connection.

* * * * *